June 10, 1941.  B. E. SHAW  2,245,229
THERMOSTATIC DRAFT CONTROL SYSTEM
Filed Aug. 7, 1939
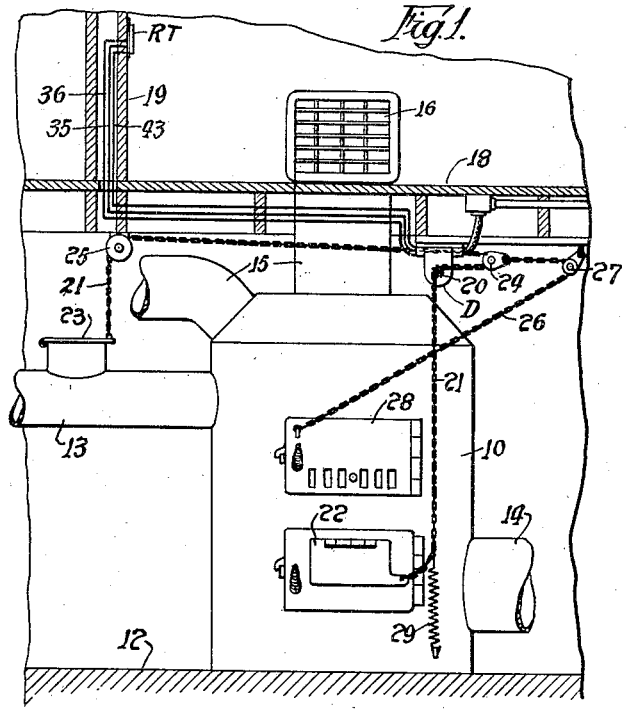
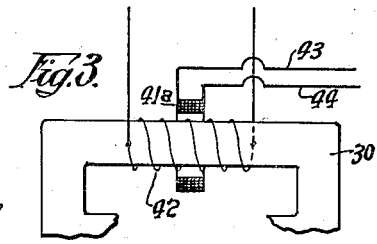
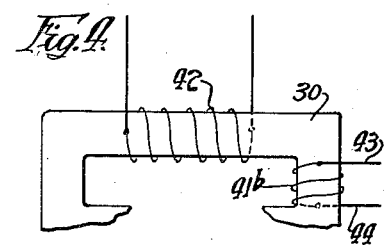
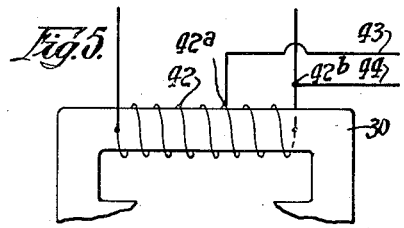
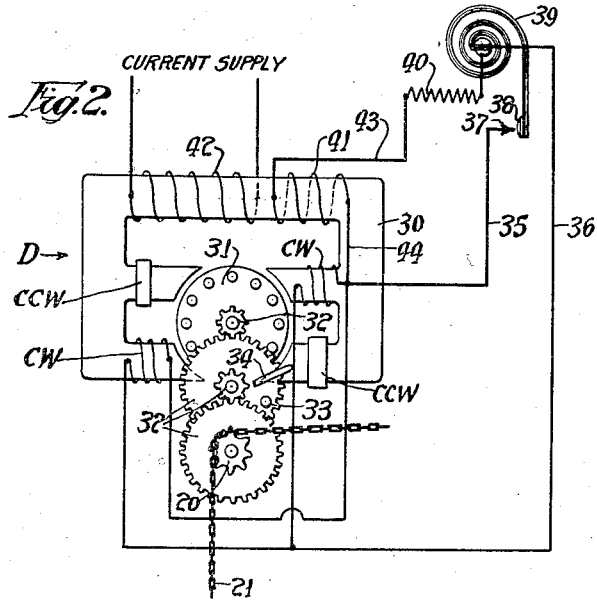
Inventor:
Burton E. Shaw,
By Bair & Freeman
Attorneys
Witness:
E. Camporini Patented June 10, 1941

2,245,229

UNITED STATES PATENT OFFICE 2,245,229

THERMOSTATIC DRAFT CONTROL SYSTEM

Burton E. Shaw, Bristol, Ind., assignor to Penn Electric Switch Co., Goshen, Ind., a corporation of Iowa Application August 7, 1939, Serial No. 288,838

3 Claims. (Cl. 236—68)

An object of my present invention is to provide a thermostatic draft control system of comparatively simple and inexpensive construction, which can be readily installed and when installed will effect automatic operation of a damper motor or the like in response to a room thermostat.

A further object is to provide a system of this character particularly applicable to control of a damper of the shaded coil type by a room thermostat, the thermostat including an anticipating heater and means being provided to energize the anticipating heater without doing so from the current supplied by the shading coil, as in my copending application, Serial No. 281,121, filed June 26, 1939.

Still another object is to provide means for supplying current to an anticipating heater of a room thermostat directly from a damper motor either by induction from a secondary coil wound on the stator of the motor, the motor being provided with a primary or energizing winding, or by means of a tap on the energizing winding whereby the winding serves as an auto transformer and supplies current at a reduced voltage for the anticipating heater.

Still a further object is to provide in a thermostatic draft control system utilizing a shaded pole type of motor wherein the room thermostat energizes certain of the shading coils, a means to energize an anticipating heater of the room thermostat without resorting to the use of current from the shading coil which varies to some extent and would therefore energize the anticipating heater to undesirable different degrees under different circumstances, my system contemplating a separate winding for supplying current to the heater.

With the foregoing and other contemplated as well as obvious objects in view, my present invention contemplates the combination of elements and arrangement of parts, together with circuit connections therefor, to cooperate with each other in the performance of the functions and the accomplishments of the results sought. My thermostatic control system comprises in one of its adaptations a form shown illustratively in the accompanying drawing, wherein Figure 1 is a horizontal sectional view through a floor and wall of a room showing a furnace below the floor and my thermostatic draft control system applied thereto;

Figure 2 is an electrodiagrammatic view of the system, and

Figures 3, 4 and 5 are electrodiagrammatic views of modifications of the damper motor which I employ.

On the accompanying drawing, I have used the reference numeral 10 to indicate generally a furnace mounted as on a basement floor 12. The stack of the furnace is indicated at 13, the cold air intake at 14 and hot air pipes at 15. One of the pipes is illustrated as terminating in a register 16 to discharge heat into a room. The floor of the room is indicated at 18 and a wall thereof at 19.

My thermostatic draft control system includes the damper motor D and a room thermostat RT. The damper motor D is provided with a slowly rotating sprocket 20 over which a chain 21 extends. The chain 21 is connected at one end with a draft door 22 and at its other end with a check damper 23.

In passing from the sprocket 20 to the damper 23, the chain 21 passes over a pair of pulleys 24 and 25. The pulley 25 is connected with a chain 26 which in turn passes over a pulley 27 and is connected with the firing door 28. A spring 29 is connected with the chain 21 to effect automatic closure of the draft door 22 in the event of power failure.

A damper motor D includes a stator 30 and a rotor 31. The rotor 31 is operatively connected with the pinion 20 by means of step-down gearing 32. One of the gears 32 may be provided with a stop pin 33 to engage a stationary stop 34 to limit rotation of the pinion 20 in either direction.

The damper motor D is of the shaded pole type having a pair of shading coils or coppers CCW, each having one turn. Other shading coils CW, having a plurality of turns, are provided and these are connected with wires 35 and 36. Whenever a circuit is established across the wires 35 and 36, the coils CW are short circuited or energized and therefore tend to buck the coils CCW, thus opening the draft door 22. The coils CW have a predominating influence on the rotor 31 and therefore cause the rotor to rotate clockwise. Whenever the clockwise coils CW are de-energized, then the counter clockwise coils CCW are effective to cause the rotor 31 to operate counter clockwise, thus closing the draft door 22 and opening the check damper 23.

For energizing the coils CW, the room thermostat RT is provided with contacts 37 and 38 connected with the wires 35 and 36, the current from the wire 36 first passing through the bimetal element 39 of the room thermostat. The bimetal element 39 is arranged so that on an increase of temperature it tends to open the contacts 37 and 38, and upon a decrease in temperature to close them, or in other words the room thermostat "closes cold."

My room thermostat RT includes an anticipating heater 40 which when energized adds a number of degrees of heat to the bimetal element 39, thus causing it to respond to a temperature lower than ambient temperature by said number of degrees. Accordingly, the differential of operation of the room thermostat may be reduced by whatever number of degrees of heat is added by the anticipating heater 40, and if desired the reduction may be far enough to produce a negative differential and accordingly cyclical operation of the damper motor D during the period of time that the room thermostat is unsatisfied. Ordinarily, the anticipating heater 40 is included in whatever circuit is controlled by the contacts 37 and 38, but if so included in the circuit of the clockwise coils CW, it will be energized by them and its degree of energization will vary in accordance with the variations in energization of the coils CW. I have found that these variations are considerable in normal operation and therefore utilizing current through the coil CW as a source for the heater 40 is unsatisfactory. Accordingly, I provide a secondary coil 41 wound on the stator 30 of the damper motor D and receiving induced current from the primary energizing coil 42 thereof normally provided in motors of this type. The current supply for the coil 42 of course is the usual 110-volt lighting current, whereas the coil 41 is of fewer turns so as to provide low voltage for the heater 40.

Other means may be provided such as winding the coil 41 over the primary coil 42 as at 41a in Figure 3. In Figure 4, a secondary coil 41b for supplying current to the anticipating heater 40 is wound on a different leg of the stator 30 than the primary coil 42. In Figure 5, the primary coil 42 is tapped as at 42a so that the portion between this tap and a terminal 42b of the coil 42 serves as an energizing coil for the wires 43 and 44 that extend to the heater 40, on the autotransformer principle. In either type of structure, as illustrated in Figures 2, 3, 4 and 5, either an induced current from the primary coil or a portion of the primary coil circuit is used as an independent source of current for the anticipating heater 40 without depending on the coils CW as a source.

For controlling energization of the coils 41, 41a, 41b or the portion of the coil 42 between the terminals 42a and 42b and also energization of the heater 40 connected in series therewith, I utilize the contacts 37 and 38 of the room thermostat so that whenever they engage each other two circuits flow through them. One circuit is the clockwise coil circuit and the other is the anticipating heater circuit, which circuits, being supplied from different coils, do not in any way interfere with each other. I secure the desirable result, however, of a substantially constant current for the heater 40 so that its degree of anticipation remains substantially constant instead of varying as would be the case in proportion to variations in the energization of the CW coils if they were used for energizing the heater.

Having described specific embodiments of my invention together with the operation thereof, I desire it to be understood that these forms are selected merely for the purpose of facilitating disclosure of the invention rather than for the purpose of limiting the number of forms which it may assume. It is to be further understood that various modifications, adaptations and alterations may be applied to the specific forms disclosed to meet the requirements of practice without in any manner departing from the spirit and scope of the present invention except as set forth in the claims appended hereto.

I claim as my invention and desire to secure by Letters Patent of the United States:

1. In a thermostatic draft control system, a damper motor having a stator, a rotor and a shading coil for effecting rotation of said rotor in one direction when the circuit of said shading coil is completed, a room thermostat having a pair of contacts included in said circuit, an anticipating heater for said room thermostat effective to reduce the temperature to which the room thermostat responds when the heater is in operation and means for energizing said heater comprising a coil on said stator and connected with said heater through said contacts.

2. In a thermostatic draft control system, a damper motor having a stator, an energizing coil wound thereon, a rotor and a shading coil for effecting rotation of said rotor in one direction when the circuit of said shading coil is completed, a room thermostat having a pair of contacts included in said circuit, an anticipating heater for said room thermostat effective to reduce the temperature to which the room thermostat responds when the heater is in operation and means for energizing said heater comprising a coil on said stator having a current induced therein by said energizing coil, said last coil being connected with said heater through said contacts.

3. In a thermostatic draft control system, a damper motor having a stator, an energizing coil wound thereon, a rotor and a shading coil for effecting rotation of said rotor in one direction when the circuit of said shading coil is completed, a room thermostat having a pair of contacts included in said circuit, an anticipating heater for said room thermostat effective to reduce the temperature to which the room thermostat responds when the heater is in operation and a second circuit energized from said energizing coil and connected with said heater through said contacts.

BURTON E. SHAW.